UNITED STATES PATENT OFFICE.

CHARLES F. SPICKER, OF NEW YORK, N. Y.

IMPROVEMENT IN COLORING AND HARDENING WOOD.

Specification forming part of Letters Patent No. 3,635, dated June 24, 1844.

*To all whom it may concern:*

Be it known that I, CHARLES F. SPICKER, of the city, county, and State of New York, have invented a new Method of Coloring and Hardening Wood and Preserving it from Decay, of which the following is a specification.

The substance used to produce the chemical change in wood, which is the object of this process, is tannin or tannic acid, which has properties adapted to condense and harden the fibrous structure of wood, and thus to make it more susceptible of a polish, as well as to preserve it from spontaneous decay and from the action of air and water and other external agents of decomposition. Although these properties, particularly that of preserving wood from decay, have incidentally come under the observation of chemists, yet little or no practical use has been made of this material for such purposes, by reason of the difficulty and expense of applying it; and my invention consists in a method of application by which it is made available for common use.

To impregnate wood in large masses and throughout its whole thickness with tannin or tannic acid, and combine the same chemically therewith, so that water cannot extract it, and together therewith to infuse a coloring matter or material that shall not be too expensive for use, and thoroughly incorporate the same with the wood, so as to make a permanent and uniform color, it is necessary with the extract of bark or other solution of tannin or tanic acid, combined with the coloring-matter, to use a strong solution of caustic potassa or soda, or even carbonate of potassa or soda, which, by momentarily softening the vegetable fiber, facilitates the mechanical passage of the fluid through the whole substance of the wood, and increases at the same time the chemical affinity of both substances for each other.

The coloring substance in this process, when any other is required than what is in natural combination with the tannin, may be any cheap vegetable color, and it does not require the more expensive mineral colors which have heretofore been supposed to be the only colors that could be used for such a purpose.

The solution of caustic potassa or soda is prepared with caustic lime in the manner that soap-boilers make their lye. In this solution oak-bark is soaked for a length of time, or even boiled till all its virtue is extracted; but instead of oak-bark, the extract of hemlock, terra-japonica, logwood, Brazil wood, or sumac may be used, and in fact all substances which consist of tannin or tanic acid or contain a great proportion thereof. Proportions, six pounds of oak bark, five pounds of potash, ten gallons of water. The coloring-matter, of course, to be of such strength and proportion as will be suitable for the shade of color which is desired, and as to which no particular directions are required. The solution (of both substances) is then put into tanks or reservoirs, and the wood, in the shape of planks or timber, put into it, where it is left to soak for from two to four weeks, until, by specimens taken out, it is shown that the mass of the wood is incorporated with the tannin or tannic acid. The wood may be used seasoned or unseasoned. It is then taken out and left to dry for a week, and then put into clear water to extract the potash or soda. It may even be boiled then without extracting the tannin. The wood may be boiled also at first in the solution of these substances above mentioned, which does not produce, however, such fine coloring. Before the wood is put into the clear water it is well, though not necessary, to steam it, which seems to assist in fixing the coloring-matter. During the time the wood is being dried it is necessary to press it from time to time, either by heavy weights or in a common press, to prevent warping.

The process of impregnating the wood may be shortened by pressure from a hydraulic press or steam upon the fluid in which the wood is soaking. To give the wood a darker color it is, after being taken from the first vat or reservoir, put into a solution of sulphate of iron or copperas, corroded in the air till it is darkened throughout, and then put into clear water to extract the sulphate of potassa or soda. To vary the color other solutions of metallic salts may be employed—such as sulphate of copper—after the wood has been tanned. The depth of the color by the tanning process depends upon the strength of the solution of caustic potassa or soda. Carbonate of potassa or soda yields a very light color. For the purpose of merely preserving timber the process may be shortened by boiling the wood in the tanning solution.

The process above described of using potash or soda in combination with tannin or tannic acid may be advantageously applied to Manila, grass, hemp, and other fibrous materials used for cordage and ship-rigging.

What I claim as my invention is—

The method of hardening and coloring wood by diffusing tannin or tannic acid, together with vegetable colors, throughout the whole structure of the wood, and incorporating the same therewith by the aid of caustic potassa or soda or other analogous substance in the mode herein described, and in varying the color afterward by the use of metallic salts whose base has an affinity for tannin or tannic acid, and also for the application of the same process to Manila grass and other articles used for cordage and ship-rigging.

CHARLES F. SPICKER.

Witnesses:
  AUG. W. RADCLIFF,
  A. R. WADSWORTH.